United States Patent
Passmore et al.

(10) Patent No.: US 9,606,362 B2
(45) Date of Patent: Mar. 28, 2017

(54) PERIPHERAL FIELD-OF-VIEW ILLUMINATION SYSTEM FOR A HEAD MOUNTED DISPLAY

(71) Applicant: Ariadne's Thread (USA), Inc., Solana Beach, CA (US)

(72) Inventors: Charles Gregory Passmore, Austin, TX (US); Adam Li, Solana Beach, CA (US)

(73) Assignee: Ariadne's Thread (USA), Inc., Solana Beach, CA (US)

( * ) Notice: Subject to any disclaimer, the term of this patent is extended or adjusted under 35 U.S.C. 154(b) by 0 days.

(21) Appl. No.: 14/820,870

(22) Filed: Aug. 7, 2015

(65) Prior Publication Data

US 2017/0038588 A1    Feb. 9, 2017

Related U.S. Application Data

(63) Continuation-in-part of application No. 14/820,774, filed on Aug. 7, 2015.

(51) Int. Cl.
*G02B 27/14*    (2006.01)
*G02B 27/10*    (2006.01)
(Continued)

(52) U.S. Cl.
CPC .......... *G02B 27/0172* (2013.01); *F21V 5/006* (2013.01); *F21V 5/045* (2013.01);
(Continued)

(58) Field of Classification Search
CPC ............ G02B 27/0172; G02B 27/0149; G02B 27/145; G02B 27/143; G02B 27/0025;
(Continued)

(56) References Cited

U.S. PATENT DOCUMENTS 5,841,439 A    11/1998 Pose et al.
6,445,815 B1    9/2002 Sato
(Continued)

OTHER PUBLICATIONS

Benton, Alex, "Understanding the Oculus Rift Distortion Shader", Oculus Rift in Action, Aug. 9, 2013, Obtained from http://rifty-business.blogspot.com/2013/08/understanding-oculus-rift-distortion.html.
Benton, Alex, "Using Timewarp on the Oculus Rift", Oculus Rift in Action, Aug. 18, 2014, Obtained from http://rifty-business.blogspot.com/2014/08/using-timewarp-on-oculus-rift.html.

*Primary Examiner* — Dawayne A Pinkney
(74) *Attorney, Agent, or Firm* — ARC IP Law, PC; Joseph J. Mayo

(57) ABSTRACT

A display system for a head mounted device that illuminates the peripheral regions of the user's field of view to enhance an immersive experience. The system may use peripheral light emitters to the left and right of one or more central displays. Peripheral light emitters may provide lower resolution images, or only with vertical resolution, corresponding to the user's lower resolution vision in these peripheral regions. Reflective surfaces and lenses may be used to direct peripheral light into desired shapes and patterns. Rendering of peripheral light colors and intensities at each peripheral pixel may use approximations for improved performance since users may not be sensitive to precise color values in the peripheral regions.

13 Claims, 17 Drawing Sheets
(8 of 17 Drawing Sheet(s) Filed in Color)

(51) Int. Cl.
*G09G 5/00* (2006.01)
*G02F 1/1335* (2006.01)
*G03B 21/26* (2006.01)
*H04N 7/00* (2011.01)
*G02B 27/01* (2006.01)
*F21V 7/00* (2006.01)
*F21V 21/084* (2006.01)
*F21V 5/00* (2015.01)
*F21V 5/04* (2006.01)
*G06T 15/50* (2011.01)
*G06T 17/20* (2006.01)
*G06T 15/04* (2011.01)
*G06T 19/00* (2011.01)

(52) U.S. Cl.
CPC .......... *F21V 7/0075* (2013.01); *F21V 21/084* (2013.01); *G06T 15/04* (2013.01); *G06T 15/506* (2013.01); *G06T 17/20* (2013.01); *G06T 19/006* (2013.01); *G02B 2027/0123* (2013.01); *G02B 2027/0134* (2013.01); *G02B 2027/0174* (2013.01)

(58) Field of Classification Search
CPC .............. G02B 27/0103; G02B 27/144; G02B 27/013; G02B 23/02; G02B 23/18; G02B 5/045; G02B 17/08
USPC ................ 359/630–639, 404, 407, 409–410, 359/618–619, 625, 13–14, 727, 732; 345/7, 9; 349/11; 631/633, 640; 353/11–12, 28, 119; 348/115; 351/41–158, 205–206, 210, 221
See application file for complete search history.

(56) References Cited

U.S. PATENT DOCUMENTS

| | | |
|---|---|---|
| 2001/0010598 A1* | 8/2001 | Aritake .............. G02B 27/0172 359/630 |
| 2007/0183649 A1 | 8/2007 | Kiefer et al. |
| 2010/0053164 A1 | 3/2010 | Imai et al. |
| 2011/0018903 A1 | 1/2011 | Lapstun et al. |
| 2012/0320088 A1 | 12/2012 | Ihara et al. |
| 2013/0235696 A1 | 9/2013 | Larsen et al. |
| 2014/0049983 A1 | 2/2014 | Nichol et al. |
| 2014/0146394 A1 | 5/2014 | Tout et al. |
| 2014/0266990 A1* | 9/2014 | Makino ................ G02B 27/017 345/8 |
| 2014/0327667 A1* | 11/2014 | Kim ....................... G06T 15/08 345/419 |
| 2015/0097858 A1 | 4/2015 | Miki et al. |
| 2015/0100179 A1 | 4/2015 | Alaniz et al. |
| 2015/0153575 A1 | 6/2015 | Komatsu et al. |
| 2015/0219899 A1 | 8/2015 | Mack et al. |
| 2015/0287230 A1 | 10/2015 | Cerny |
| 2015/0294505 A1 | 10/2015 | Atsmon |
| 2016/0116748 A1 | 4/2016 | Carollo et al. |

\* cited by examiner

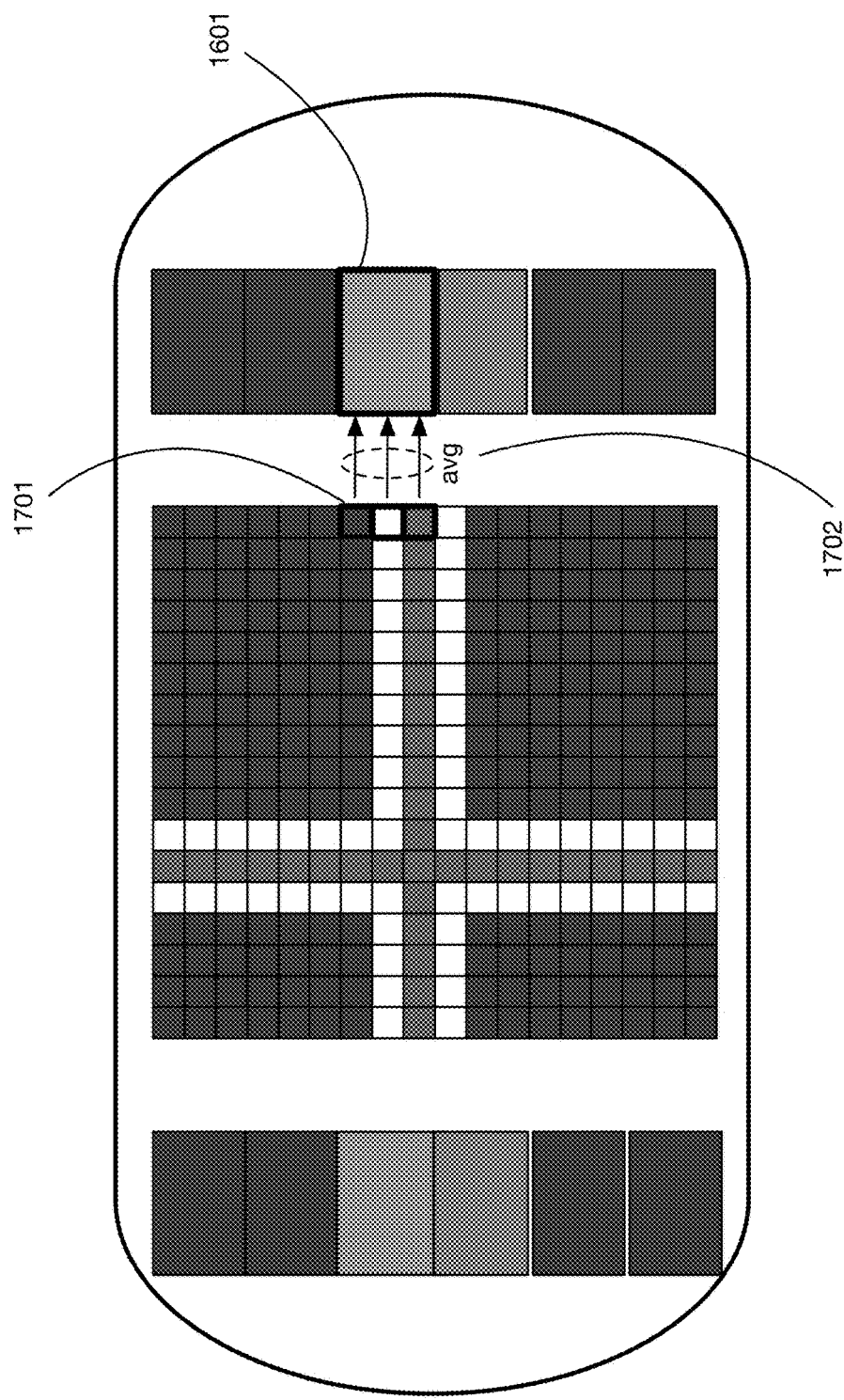

PERIPHERAL FIELD-OF-VIEW ILLUMINATION SYSTEM FOR A HEAD MOUNTED DISPLAY

This application is a continuation in part of U.S. Utility patent application Ser. No. 14/820,774, filed Aug. 7, 2015, the specification of which is hereby incorporated herein by reference.

BACKGROUND OF THE INVENTION

Field of the Invention

One or more embodiments of the invention are related to the field of virtual reality systems. More particularly, but not by way of limitation, one or more embodiments of the invention enable a head mounted display system that uses a peripheral field-of-view illumination system to create an immersive image covering a significant portion of a user's natural field of view.

Description of the Related Art

Virtual reality systems are known in the art. Such systems generate a virtual world for a user that responds to the user's movements. Examples include various types of virtual reality headsets and goggles worn by a user, as well as specialized rooms with multiple displays. Virtual reality systems typically include sensors that track a user's head, eyes, or other body parts, and that modify the virtual world according to the user's movements. The virtual world consists of a three-dimensional model, computer-generated or captured from real-world scenes. Images of the three-dimensional model may be affected by the user's position and orientation, or by other factors such as the user's actions or parameters of the user's physical state. Generation of these images requires rendering of the three-dimensional model onto one or more two-dimensional displays that are integrated into a head mounted device.

A major challenge for existing virtual reality systems is that they have limited fields of view. These systems typically use head mounted devices with flat displays positioned in front of and parallel to the user's eyes. The field of view as seen by the user extends only to the edges of the display. The geometry and design of existing head mounted display devices provides a horizontal field typically on the order of 100 degrees. This field of view is far below the user's natural horizontal field of view, which is more than 180 degrees. Users therefore do not perceive the virtual reality environment as completely realistic.

In particular, existing virtual reality systems typically do not project any images into the peripheral regions of the user's field of view. User's have relatively low resolution vision in these peripheral regions, but complete lack of images in the peripheral regions compromises the quality of the virtual reality environment.

For at least the limitations described above there is a need for a peripheral field-of-view illumination system for a head mounted display.

BRIEF SUMMARY OF THE INVENTION

One or more embodiments described in the specification are related to a peripheral field-of-view illumination system for a head mounted display.

One or more embodiments of the system use a pair of angled displays and a lens system to create an immersive image covering a significant portion of a user's natural field of view. One or more embodiments use displays that are substantially flat; this configuration results in a wide field-of-view image using a compact display device that uses economical and readily available flat displays.

One or more embodiments of the system are incorporated into, attached to, or embedded in a mount that is configured to be worn on the head of a user or placed near the head of a user. This mount may include for example, without limitation, glasses, smart glasses, sunglasses, goggles, virtual reality goggles, a helmet, a visor, a hat, binoculars, a monocular, a telescope, or a microscope.

One or more embodiments include a left display and a right display, each located in front of the respective eye of the user. In one or more embodiments, the left display and right display may be substantially flat. Use of flat or substantially flat displays may provide cost and sourcing advantages since flat displays are readily available and can be manufactured at low cost. In one or more embodiments the left display and right display may be curved or formed from multiple sections angled with respect to one another; while curved displays may be more expensive in some cases, they may also simplify the geometry and optics of the system. Embodiments may use displays of any size or shape, along with one or more lenses to potentially increase the field of view.

In one or more embodiments, the left display and right display may be angled with respect to one another, rather than being parallel. For example, the angle between a plane tangent to the left display and a plane tangent to the right display may be less than 180 degrees, when measured from the side near the eyes of the user. This configuration may bring the left edge of the left display closer to the user's left eye, increasing the horizontal field of view perceived by the user. Similarly, this configuration may bring the right edge of the right display closer to the user's right eye, increasing the horizontal field of view perceived by the user.

One or more embodiments may include one or more lenses between the displays and the user's eyes. These lenses may for example form images of the displays that extends across a wider field of view than the displays themselves without the lenses. The lens or lenses may therefore increase the apparent field of view of the system. In one or more embodiments some or all of the pixels of the left and right displays may be substantially in focus when viewed through the lens or lenses. In one or more embodiment some or all of the pixels of the left and right displays may be out of focus to create diffuse images in certain portions of the field of view, for example at the periphery.

Embodiments of the system may use any type, number, and configuration of lenses. In one or more embodiments, one or more of the lenses may be a gradient index lens. A gradient index lens for example may provide significant curvature of the light rays from the displays with a relatively thin lens. In one or more embodiments, one or more of the lenses may be a Fresnel lens, which may also provide significant curvature of light rays with a relatively thin lens. One or more embodiments may use one or more holographic optical elements in conjunction with or in place of one or more lenses.

The image formed by the lens or lenses may be of any size and shape, and may extend across any vertical or horizontal field of view. In one or more embodiments the horizontal field of view of the image may for example exceed 120 degrees, 150 degrees, 180 degrees, or any other desired extent.

One or more embodiments of the system may use lower resolution at the periphery than in the central region of the user's field of view, to correspond to the variable resolution of the user's vision across the field of view. For example, one or more embodiments may include light emitting elements to the left of the left display, or to the right of the right display. These peripheral light emitting elements may for example be of lower resolution than the resolution of the left and right displays. In one or more embodiments the peripheral light emitting elements may have for example only vertical resolution and little or no horizontal resolution. In one or more embodiments the light from the peripheral light emitting elements may be directed by the lens or lenses towards the peripheries to form for example diffuse, low-resolution light in the peripheral portions of the user's field of view. In one or more embodiments the peripheral light emitters may be portions of the left and right displays, with pixels from these peripheral portions directed by the lens or lenses away from the focal points for the central regions of the left and right displays.

One or more embodiments of the system may use peripheral light emitters on the right and left sides of one or more central displays, either with or without lenses. The central displays may form one or more display images in a central portion of the user's field-of-view, and the light from the peripheral light emitters may be projected to the sides of the display images to fill all or a portion of the user's peripheral field-of-view.

In one or more embodiments the combined field of view from the central display images and the light from peripheral light emitters may span the user's entire natural field of view, which may exceed for example 180 degrees. One or more embodiments may generate images and peripheral light that spans a portion of the user's field of view, such as for example, without limitation, 120 degrees, 150 degrees, or 180 degrees.

Embodiments may use any number and configuration of peripheral light emitters. For example, in one or more embodiments, the peripheral light emitters may comprise a single left column of peripheral light pixels to the left of the central displays, and a single right column of peripheral light pixels to the right of the central displays. This arrangement provides only vertical resolution in the peripheral regions of the user's field of view. Other embodiments may provide both vertical and horizontal resolution in the peripheral regions. Embodiments may use any desired resolution for both central displays and peripheral light emitters, including for example resolutions of the peripheral light emitters that are lower than the resolution of the central displays, to match the user's lower vision resolution in these regions. In one or more embodiments, peripheral light emitters may be configured with any desired peripheral light pixel pattern with any desired vertical and horizontal resolution.

In one or more embodiments the light from peripheral light emitters may be directed towards the peripheral areas of the user's field of view, either directly or using one or more lenses. In one or more embodiments, reflective surfaces may be used on the peripheral regions of the viewable area of the mount to direct light towards the user. These left and right reflective surfaces may for example provide specular or diffuse reflection to generate peripheral light of any desired pattern and intensity. Reflective surfaces may be of any material, shape, size, color, and reflectivity. They may reflect all or any portion of the light falling on the surfaces towards the eyes of the user.

One or more embodiments of the system may include one or more renderers that generate the images viewed by the user from a 3D model of a scene. A 3D model may be for example a virtual reality environment, or videos captured of a real scene from several angles, or a combination of computer-generated and real elements. One or more embodiments may use a display renderer to generate the pixels for one or more central displays, and a peripheral renderer to determine the light colors and intensities for the peripheral light pixels of one or more peripheral light emitters. Because some embodiments may use peripheral light emitters of relatively low resolution compared to the central displays, one or more embodiments may employ various peripheral rendering approximations to calculate the light values for the peripheral light pixels. While these approximations may be inappropriate in some cases for the central display, where the user's field of view has high resolution, they may be sufficient for the peripheral field of view. Moreover, use of peripheral rendering approximations may reduce the computational and memory requirements for the system, potentially lowering cost and improving display latency.

One or more embodiments may calculate a peripheral rendering approximation that uses sample points within a peripheral light pixel area, and casts a ray from the user's eye (the left eye for the left peripheral light pixels, and the right eye for the right peripheral light pixels) through each sample point towards the 3D model. Using raycasting techniques known in the art, the color of the sample point may be determined by selecting the color of the first object in the 3D model hit by each ray. One or more embodiments may use for example an average of the sample point colors from raycasting to set the color for the associated peripheral light pixel.

One or more embodiments may calculate a peripheral rendering approximation that uses the pixel colors for central display pixels adjacent to or near to each peripheral light pixel. For example, one or more embodiments may use an average color for the adjacent or nearest display pixels as the color for each peripheral light pixel. This approximation may be highly efficient since the rendering performed by the display renderer is used directly for the peripheral rendering.

One or more lenses may be used in conjunction with any of the embodiments described above. Any type, number, and configuration of lenses may be used. Lenses may be for example, without limitation, gradient index lenses, Fresnel lenses, or traditional convex or concave lenses of uniform material.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the invention will be more apparent from the following more particular description thereof, presented in conjunction with the following drawings wherein:

FIG. 17 illustrates an embodiment of a peripheral renderer that sets a peripheral light pixel color by averaging the colors of the adjacent pixels in a central display.

DETAILED DESCRIPTION OF THE INVENTION

A peripheral field-of-view illumination system for a head mounted display will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
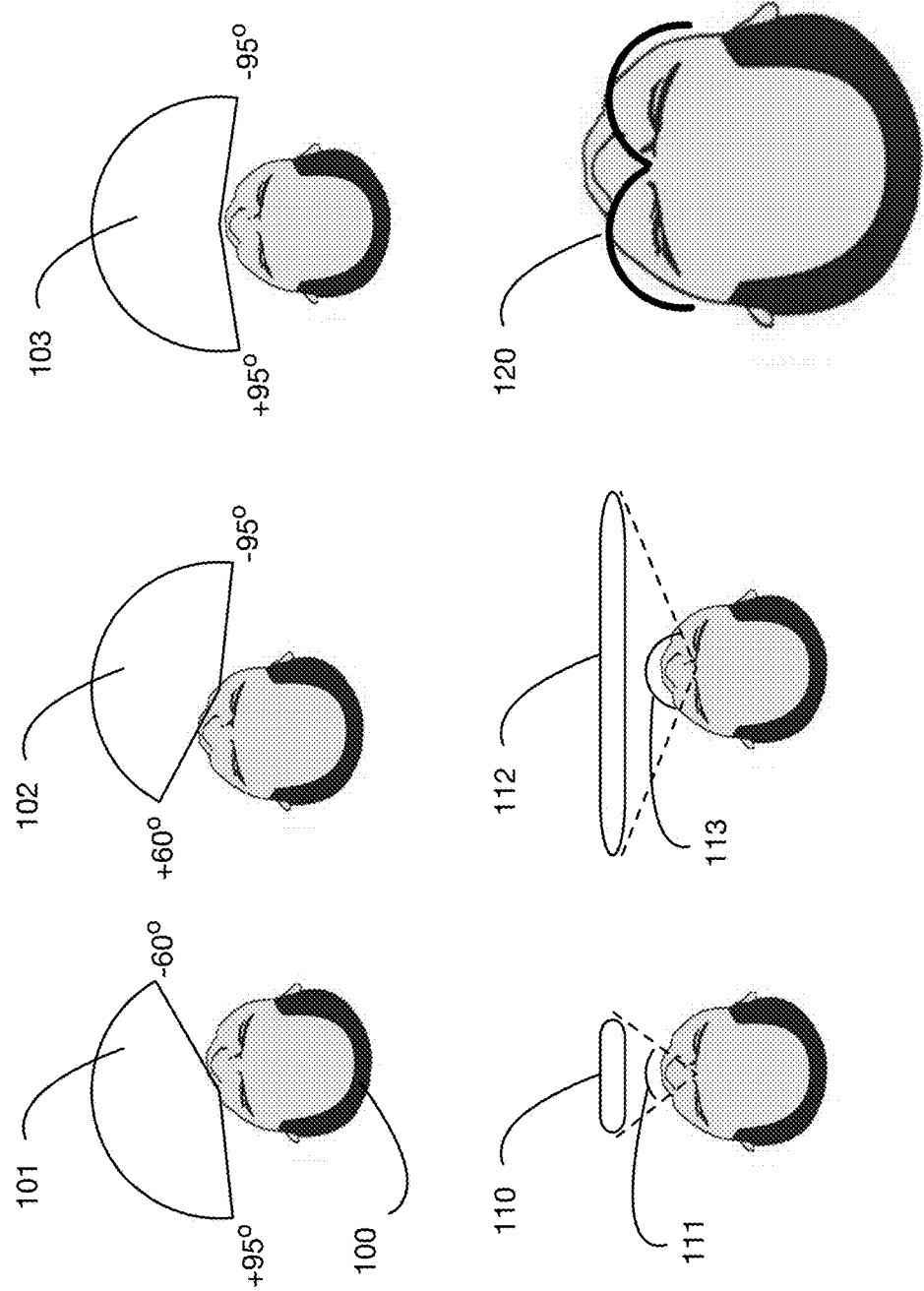
FIG. 1 illustrates the typical field of view of a user, and the challenge of creating a wide field-of-view display for a head mounted system.

FIG. 1 illustrates the challenge of providing a wide field-of-view display for a head mounted device. A typical user has a horizontal field of view 101 for the left eye and 102 for the right eye that each span approximately 155°. The combined field of view 103 for both eyes spans approximately 190°. In contrast, a typical head-mounted display like 110 has a small horizontal field of view 111. Thus a user with a typical head-mounted display like 110 does not have an immersive experience since much of the user's natural field of view is unused. FIG. 1 illustrates two potential approaches to enlarging the field of view of the display. One option is to use a much larger display 112, which increase the horizontal field of view to 113. This approach is undesirable because it results in displays that are bulky, heavy, and expensive. Another theoretical approach is to curve the display around each eye, as shown in 120. A disadvantage of this approach is that curved displays surrounding the entire field of view around an eye are not readily available and they may be expensive to manufacture.

Figure 2:
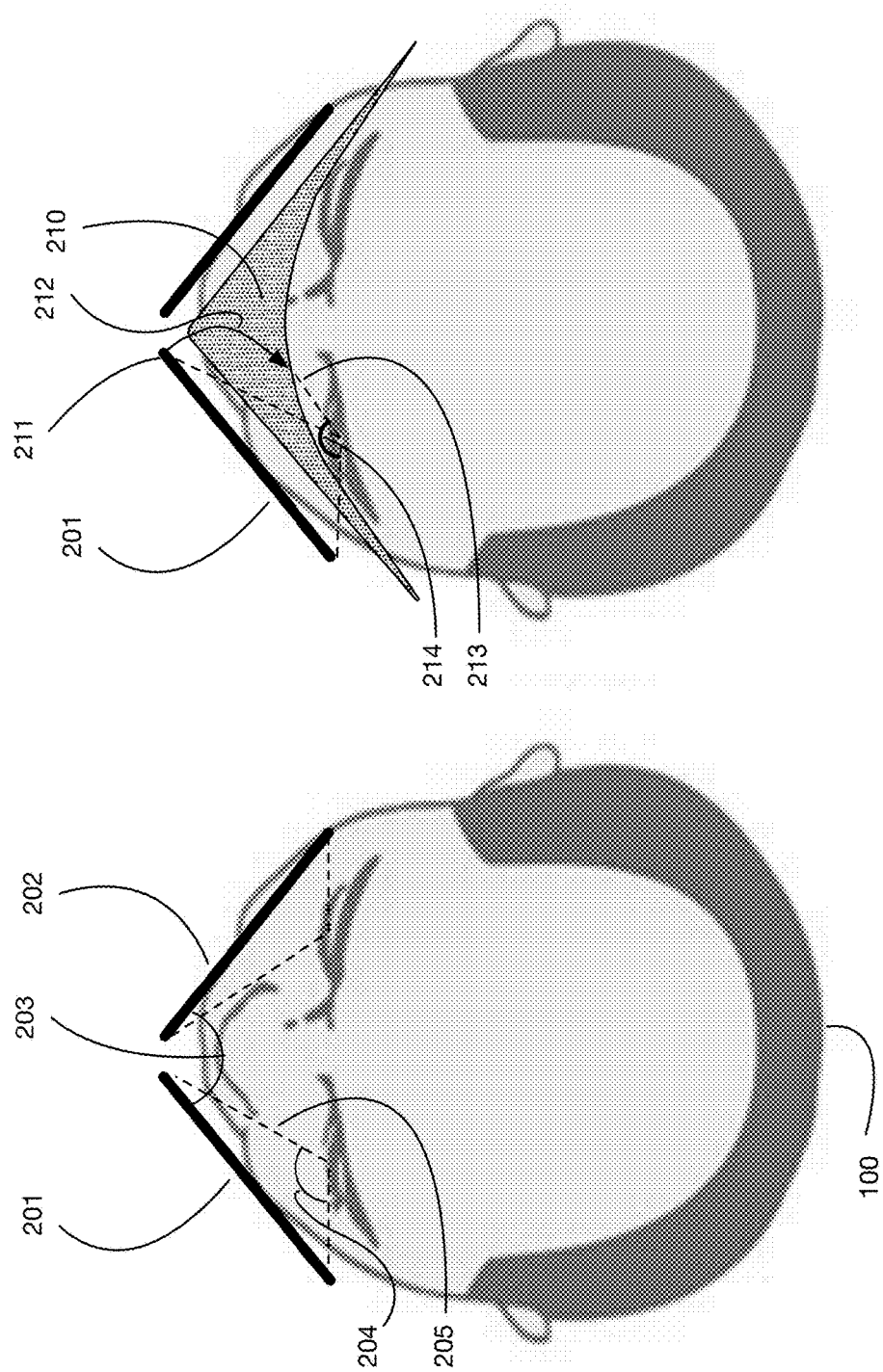
FIG. 2 illustrates the geometry of an embodiment of the system that has flat left and right displays at an angle, and a lens between the displays and the users' eyes that enlarges the field of view.

FIG. 2 illustrates an approach used in one or more embodiments of the invention to increase the field of view of the display beyond that of a typical device 110 in FIG. 1. The display is separated into a left display 201 in front of the left eye of the user, and right display 202 in front of the right eye of the user. In the embodiment shown in FIG. 1 the left and right displays are flat or substantially flat, which may in some cases provide cost or sourcing advantages. In one or more embodiments the left or right display (or both) may be further segmented into multiple displays. In FIG. 2, the left edge of display 201 is angled towards the user 100, which brings this left edge further towards the leftward extreme of the user's field of view. Similarly the right edge of display 202 is angled towards the user, which brings the right edge further towards the rightward extreme of the user's field of view. The left display 201 and right display 202 are therefore not parallel; they are at an angle 203 that is less than 180°. The left eye field of view 204 that results from angling the display may be larger in some embodiments that the corresponding field of view for a narrow angle flat display like display 101 in FIG. 1. Embodiments may use left and right displays of any size and shape. In one or more embodiments the left and right displays may be curved for example, or formed from multiple sections lying on different planes, instead of flat as shown in the embodiment of FIG. 1. One or more embodiments may use flat displays for ease of manufacturing and sourcing. The angles 203 and 204 are only illustrative; one or more embodiments may use any angle between left and right displays, and may use any desired width and height for the left and right displays. For embodiments that use curved displays, the angle between displays may be considered for example to be the angle between planes that are tangent to each display at selected points on the displays.

One or more embodiments may further extend or alter the field of view for the display by using one or more lenses between the displays and the eyes of the user. This is illustrated in the right side of FIG. 2, with lens 210 between the displays and the user's eyes. One or more embodiments may use any number and configuration of lenses to bend, focus, or otherwise direct the light emitted or reflected from the displays. Lenses may be of any desired material and shape. One or more embodiments may use one or more adjustable lenses that may for example be focused or otherwise adjusted by a user. In FIG. 2, Lens 210 bends the light rays emitted from the displays 201 and 201 so that they appear to be coming from different directions. Thus the image of the display pixels viewed by the user may have a larger field of view than the displays themselves (without the lens or lenses). For example, light ray 212 from pixel 211 on left display 201 is bent by lens 210, so that the apparent direction 213 of this pixel is further to the right than the direction 205 of the pixel when viewed without the lens. Thus the horizontal field of view 214 of the image of the left display with the lens is greater than the field of view 204 without the lens. Similarly the field of view of the image of the right display with the lens is greater than the field of view without the lens. One or more embodiments may therefore use one or more lenses to enlarge the apparent field of view of the displays.

Figure 3:
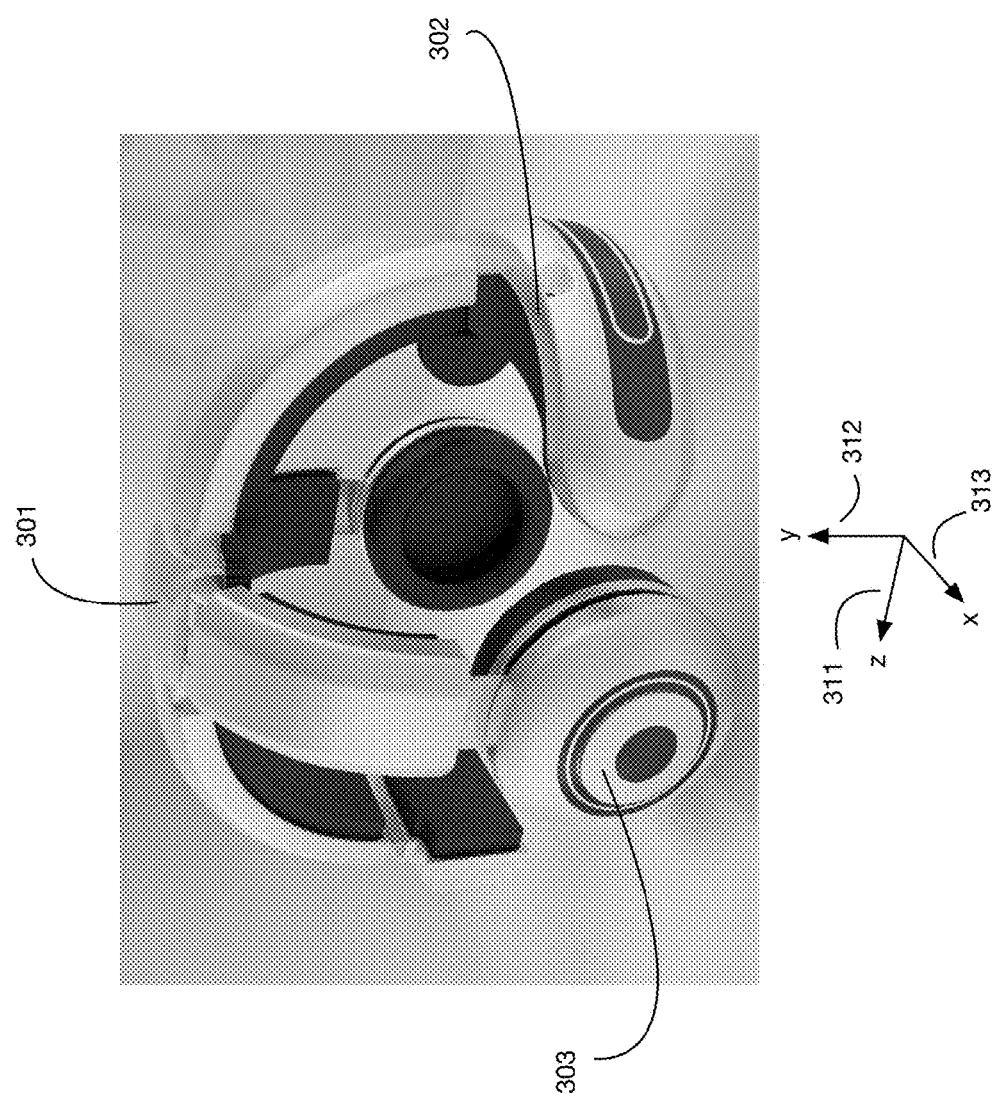
FIG. 3 illustrates an embodiment of head mounted system that incorporates a wide field-of-view display.

FIG. 3 illustrates an embodiment that incorporates a wide field of view display into mount 301. Axis 311 (z) of the figure as shown points backwards (into the user's eyes); axis 313 (x) points left-to-right, and axis 312 (y) points bottom-to-top. The front area 302 of the mount houses for example the left and right displays and the lens or lenses (for example as shown in FIG. 2). Speaker 303 may be used in one or more embodiments to provide audio in addition to video. The shape and components illustrated in FIG. 3 are illustrative only; embodiments may incorporate a wide field of view display system into any head mounted device of any size, shape, and configuration.

Figure 4:
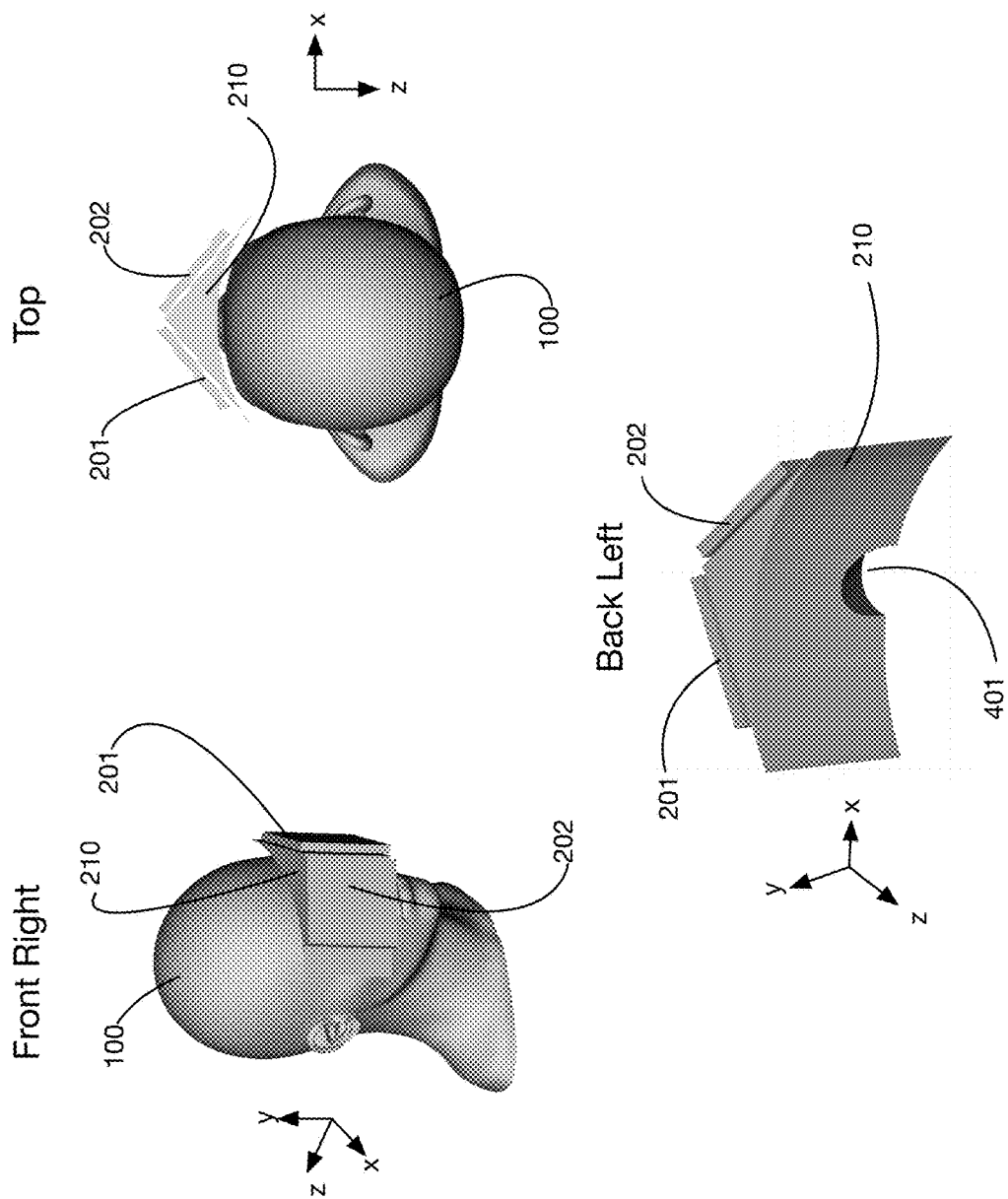
FIG. 4 shows a three dimensional model of the displays and lens for an embodiment of the system.

FIG. 4 illustrates several 3D views of an embodiment of the system from different orientations. Only the displays and lens are shown; other elements of a mount (such as for example the mount of FIG. 3) are not shown. The coordinate axes from FIG. 3 are shown for reference for each view. In the back left view, cutout 401 in the lens 210 is apparent; this cutout is for the user's nose. One or more embodiments may use lenses or displays of any shape or size. For example, lenses or displays may be configured to conform to any shape of a user, or of any device worn by or used by a user. As an example, one or more embodiments may be configured to be attached to any device worn by a user, such as for example, without limitation, glasses, sunglasses, goggles, helmets, visors, hats, contact lenses, or ocular implants.

Figure 5:
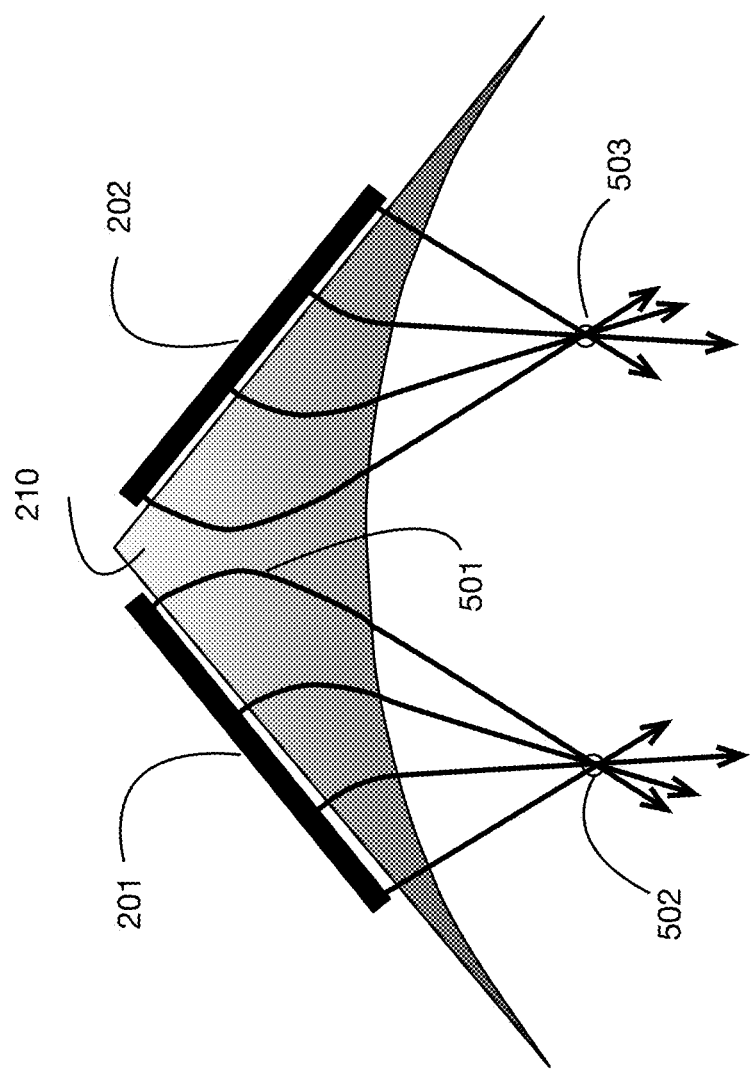
FIG. 5 shows a cross sectional view of the embodiment shown in FIG. 4, illustrating how the lens bends light rays emitted from the displays.

FIG. 5 shows a top view of an embodiment of the displays 201 and 202, and the lens 210. In this embodiment the lens is a gradient index lens, where the index of refraction of the lens changes continuously throughout the lens volume. One or more embodiments may use gradient index optics for one or more of the lenses of the system. An advantage of gradient index optics is that light rays can be bent significantly and in highly versatile ways using a relatively thin lens. For example, light can be focused in the middle area of a gradient index lens, but deflected outward at the edges of the lens to fill the user's peripheral field of vision. The gradient index lens entry and exit zones (layers) may also act as a collimator and optical relay to reduce the effect of non-parallel rays which would degrade the image. One or more embodiments may use Fresnel lenses. Fresnel lenses also provide the advantage of being relatively thin. Embodiments may use any type of lens or lenses between the displays and the user's eyes. One or more embodiments may use combinations of different types of lenses. One or more embodiments may use one or more holographic optical elements to diffract, reflect, or transmit light in any desired pattern. Holographic optical elements may be used for example in conjunction with other lenses, or in place of certain lenses.

In a simple lens consisting of uniform material, refraction of light rays occurs only at the lens surfaces. In a gradient index lens, such as the lens 210 in FIG. 5, refraction may occur throughout the lens due to continuous variations in the index of refraction of the lens material. For example, light ray 501 bends throughout the lens material 210, and not just at the boundaries of the lens. One or more embodiments may use any lens or combination of lenses to bend light in any desired manner, in order to form images of any shape and size. In the embodiment of FIG. 5, lens 210 focus the light rays from left display 201 onto point 502, which may for example be at or near the left eye of the user, and it focuses the light rays from right display 202 onto point 503, which may for example be at or near the right eye of the user.

Figure 6:
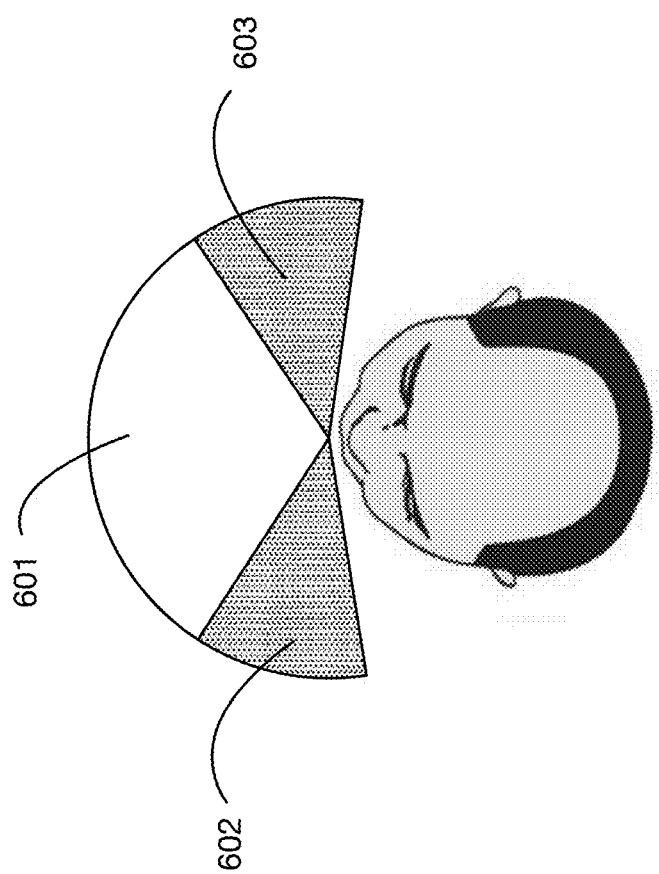
FIG. 6 illustrates the high resolution central field of view of a user, and the relatively low resolution peripheral field of view of the user.

One or more embodiments may optimize or otherwise configure the display and lens system to reflect the variable resolution of human vision in different portions of the field of view. FIG. 6 illustrates this variable resolution. Human vision has relatively high resolution in the central region 601 of the field of view, and relatively poor resolution in the peripheral regions 602 and 603. High resolution display or images in the peripheral regions of the field of view may therefore add little or nothing to the user's experience. However, for an immersive experience, it is preferable to provide some image across the user's entire field of view.

Figure 7:
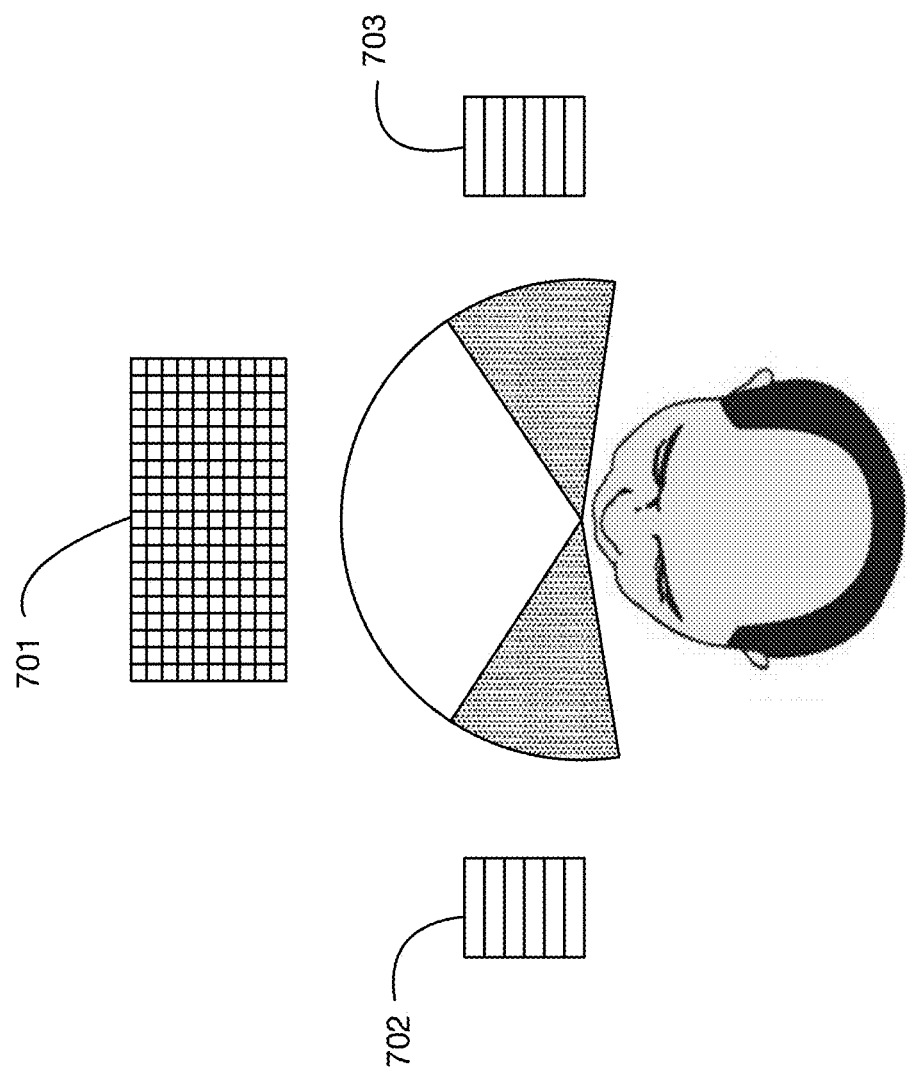
FIG. 7 illustrates an embodiment of the system that provides a high resolution display for the central portion of a user's field of view, and low resolution display for the peripheral portion of the user's field of view.

FIG. 7 illustrates a conceptual approach employed by one or more embodiments to optimize the display system to reflect the variable resolution across the field of view. In the central region of the field of view, a high resolution display 701 is provided. In the peripheral left and right regions of the field of view, low resolution displays 702 and 703 are provided. In the embodiment illustrated in FIG. 7, the peripheral displays have only vertical resolution and they are horizontally uniform. One or more embodiments may use peripheral displays with horizontal resolution as well as or instead of vertical resolution. Embodiments may use any desired density for central and peripheral displays. The technologies used to generate displays or images for the central region may be different from those used for the peripheral regions in one or more embodiments. For example, an embodiment may use a standard rectangular pixel display for the central region, and use LEDs or other light emitting devices at a low resolution for the peripheral regions. The light emitting devices for peripheral regions may for example project coarse or diffuse light towards the peripheral areas of the viewing device. The intensity and color of the diffuse light in the peripheral regions may be determined for example based on average luminance or color values in peripheral regions of the scene being displayed.

Figure 8:
FIG. 8 illustrates an image as viewed for example in an embodiment of the system as illustrated in FIG. 7.

FIG. 8 illustrates an image that may be produced by one or more embodiments that uses low resolution images in the peripheral regions. In this illustrative example, the central area 701 of the image has significant vertical and horizontal resolution. The left and right peripheral regions of the image 702 and 703 in this example have no horizontal resolution, and relatively low vertical resolution.

Figure 9:
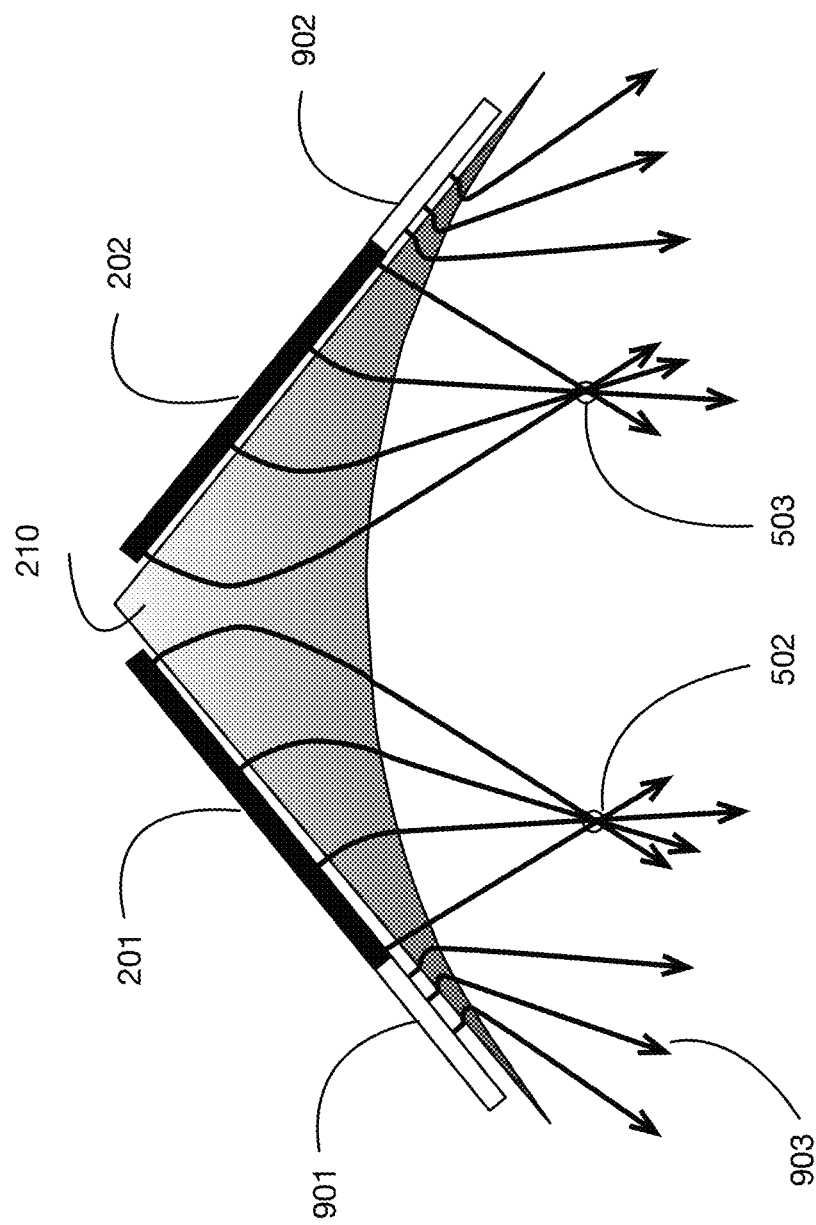
FIG. 9 illustrates an embodiment of the system that provides potentially lower resolution diffuse light for the peripheral vision regions of the user's field of view, using a lens to project unfocussed light towards the periphery.

One or more embodiments may use a lens or combination of lenses to direct the peripheral light or peripheral images towards the edges of the viewing device. FIG. 9 illustrates an embodiment that extends the example shown in FIG. 5 to generate unfocused images in the periphery of the user's field of view. This embodiment has a left peripheral display region 901 to the left of display 201, and a right peripheral display region 902 to the right of display 202. In one or more embodiments a peripheral display region may be part of an integrated display that includes for example both 201 and 901. In one or more embodiments the peripheral display regions may instead be separate devices, such as for example lower resolution displays or arrays of individual light emitting devices. The lens 210, which may for example be a gradient index lens, bends the light from the peripheral display regions outward towards the edges of the viewing device. These light rays may for example not converge at the focal points 502 and 503. For example, light ray 903 from left peripheral display region 901 is bent outward by lens 210 and it does not converge on focal point 502. The user may therefore view the images from regions 901 and 902 as diffuse, unfocused light rather than as focused high resolution pixels.

Figure 10:
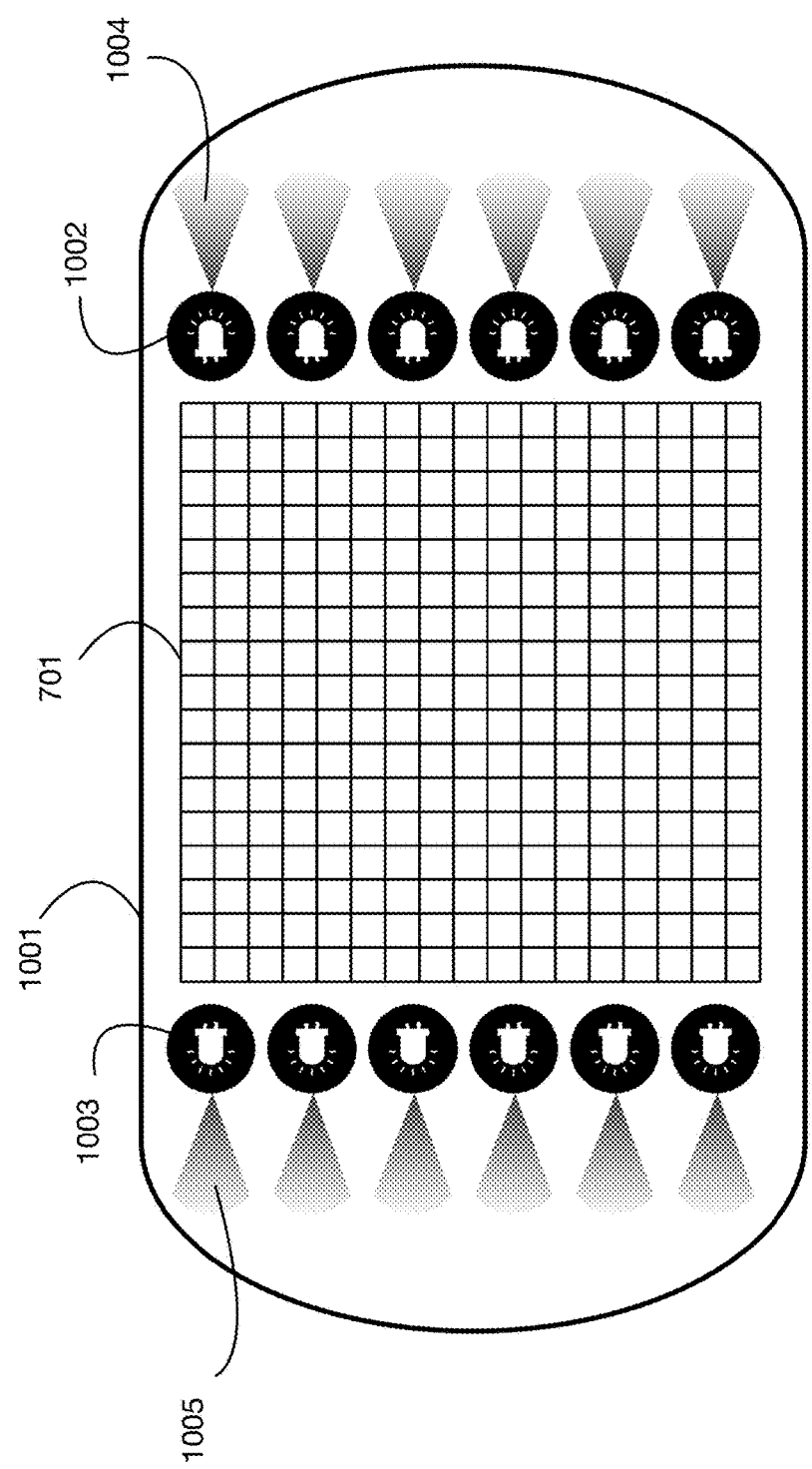
FIG. 10 illustrates an embodiment of the system that has a central display and a series of low-resolution, vertically spaced peripheral light pixels to the left and right of the central display.

One or more embodiments of the system may use peripheral light emitters with or without lenses. FIG. 10 illustrates an embodiment of the system front viewable area 1001 positioned in front of the eyes of a user. This area includes a high resolution central display 701, and two columns of peripheral light pixels to the left and right of the central display. Each peripheral light pixel directs light towards the periphery of the user's field of view. For example, right peripheral light pixel 1002 directs light 1004 towards the right of the user's field of view, and left peripheral light pixel 1003 directs light 1005 towards the left of the user's field of view. Embodiments may use any number, size, configuration, location, technology, and density of peripheral light pixels. Embodiments may also use any number, size, configuration, location, technology, and density of central displays. Because of the differences in resolution between a user's central field of view and peripheral field of view, as illustrated for example in FIG. 6, one or more embodiments may use relatively lower density of peripheral light pixels compared to the density of pixels in the central display or displays. One or more embodiments may use peripheral light pixels that emit diffuse light.

Figure 11:
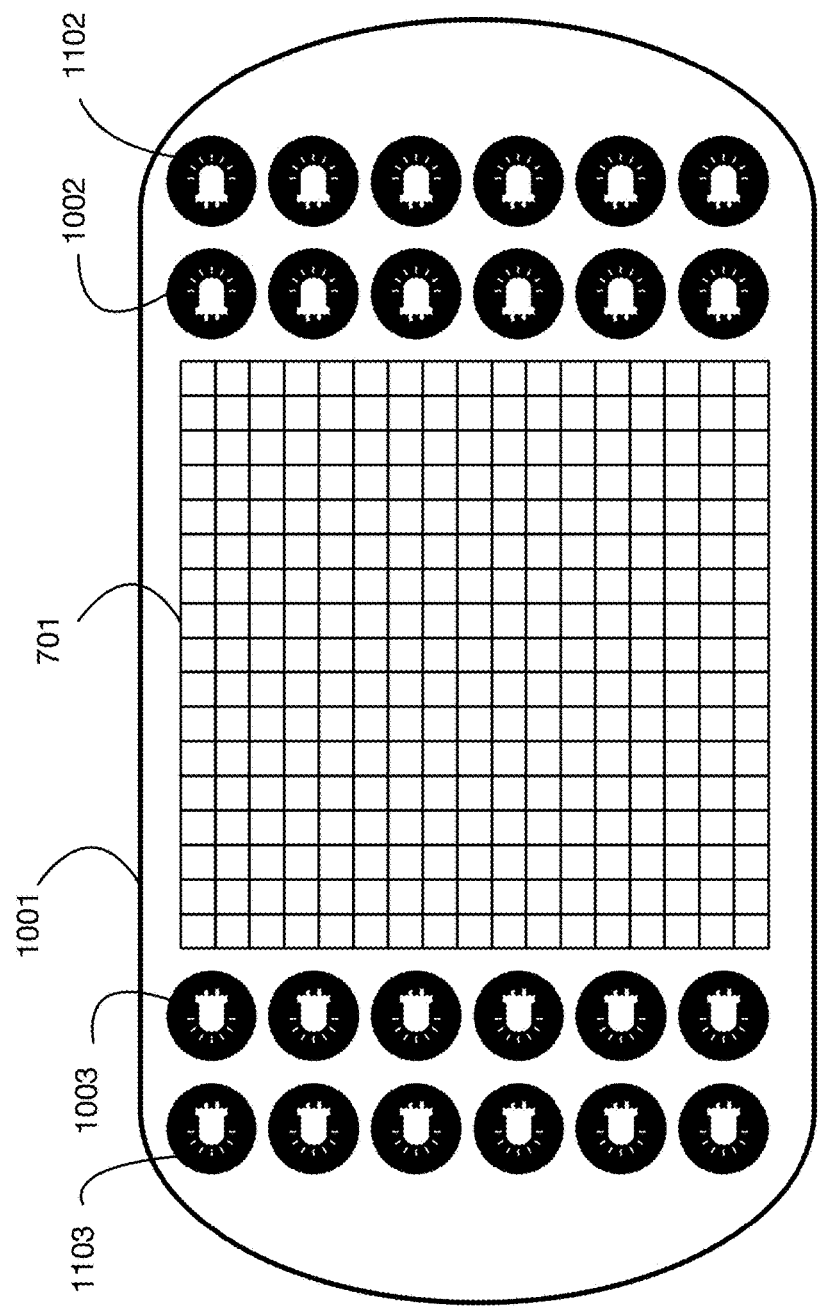
FIG. 11 illustrates a variation of the embodiment shown in FIG. 10, with multiple vertical columns of peripheral light pixels on either side of the central display.
Figure 12:
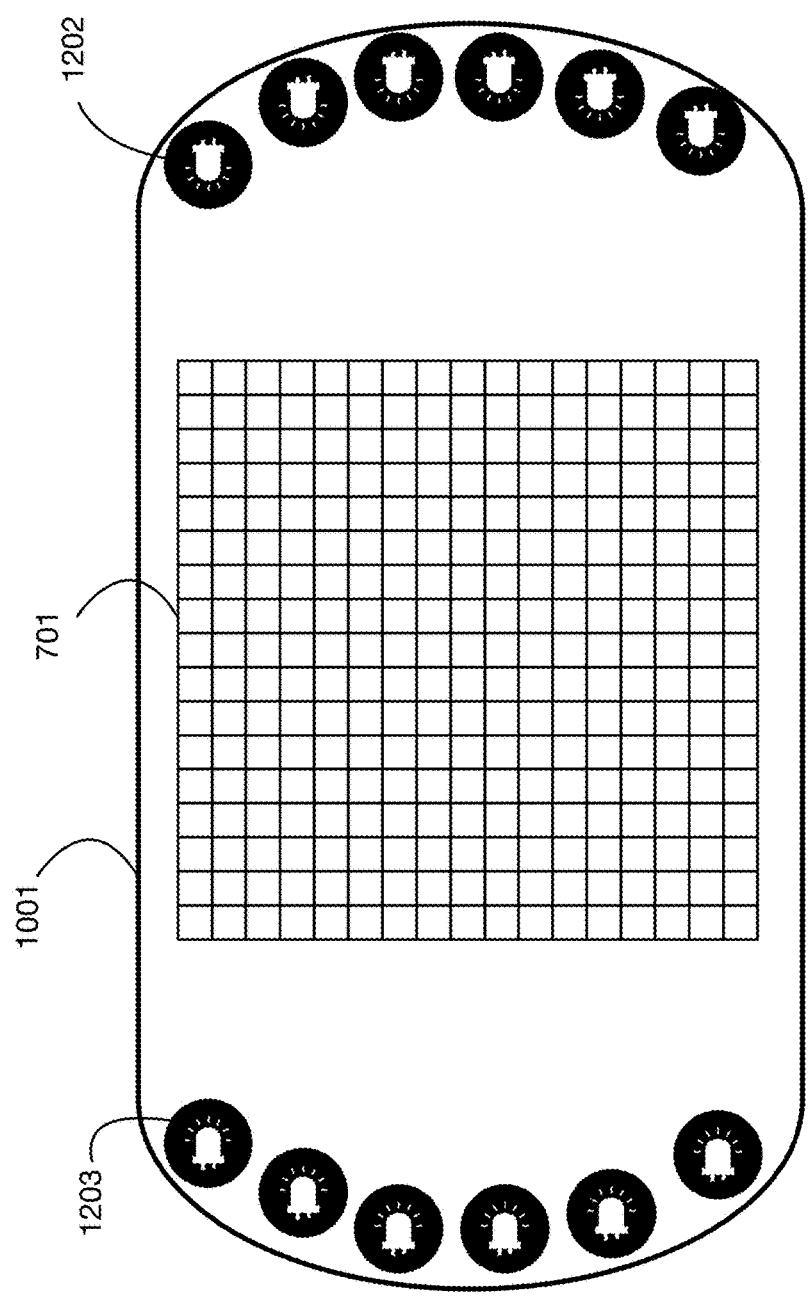
FIG. 12 illustrates a variation of the embodiment shown in FIG. 10, with peripheral light pixels positioned at the outer edges of the viewable area of the mount.
Figure 13:
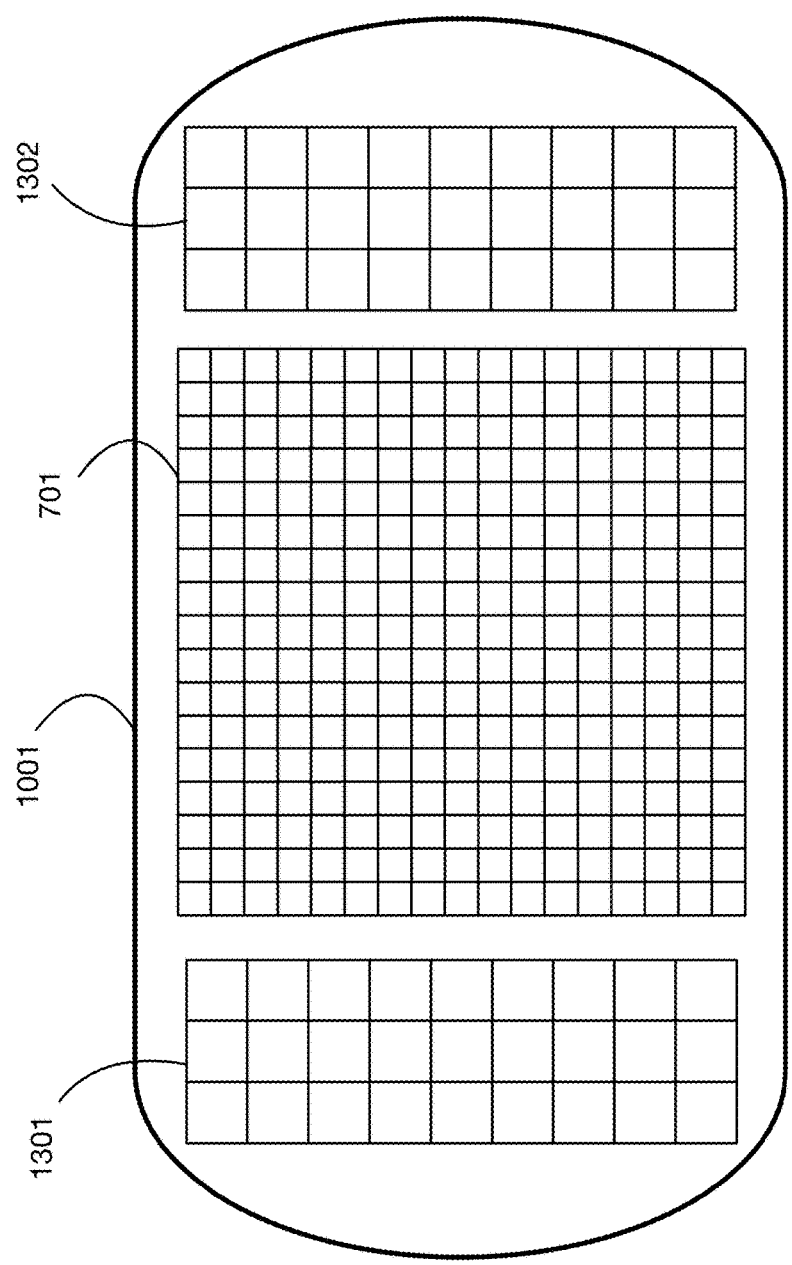
FIG. 13 illustrates a variation of the embodiment shown in FIG. 10, with a left and right low-resolution display on the sides of the higher resolution central display.

The configuration of peripheral light pixels shown in FIG. 10 is illustrative; FIGS. 11, 12, and 13 show some exemplary variations on this configuration that may be used in one or more embodiments. In FIG. 11 there are two columns of peripheral light pixels on each side of the central display 701—such as pixels 1002 and 1102 on the right and pixels 1003 and 1103 on the left. This configuration provides a very coarse horizontal resolution on the periphery, with a higher vertical resolution which is still below the vertical resolution of the central display 701. In FIG. 12 the peripheral light pixels are positioned at the outer edges of the viewable area 1101, such as right peripheral light pixel 1202 and left peripheral light pixel 1203. These peripheral light pixels may for example direct light inward rather than outward. In FIG. 13 low-resolution rectangular displays 1301 and 1302 are used for peripheral light emitters. These peripheral displays may for example be for example LCD screens, OLED screens, or any other display technology. These configurations shown in FIGS. 10, 11, 12, and 13 are illustrative; embodiments may configure peripheral light emitters and their peripheral light pixels in any desired configuration or pattern.

Figure 14:
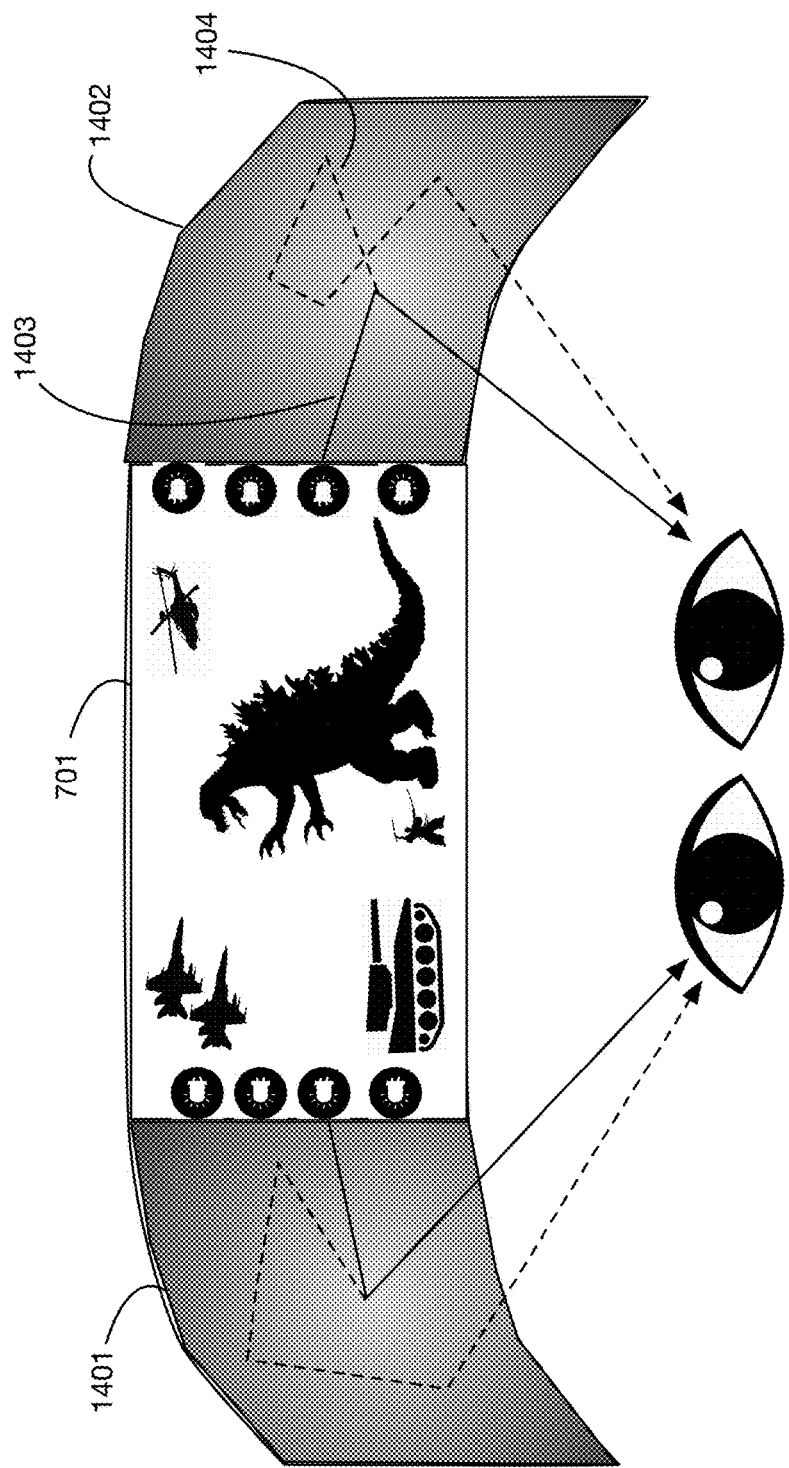
FIG. 14 illustrates an embodiment of the system with reflective left and right edges that reflect light from the peripheral light emitters towards the user's eyes.

FIG. 14 illustrates an embodiment of the system with a single central display 701, a left reflective surface 1401, and a right reflective surface 1402. These reflective surfaces may for example provide specular or diffuse reflection to generate peripheral light of any desired pattern and intensity. An illustrative light ray 1403 is emitted by a peripheral light pixel, and it reflects off the surface towards the user's right eye. In addition, one or more secondary rays such as 1404 may be reflected in other directions, and some of these secondary rays may also be reflected eventually back towards the eye of the user. The effect of these multiple reflections may be to create a diffuse pattern of light that fills all or a significant portion of the user's peripheral field of view.

Figure 15:
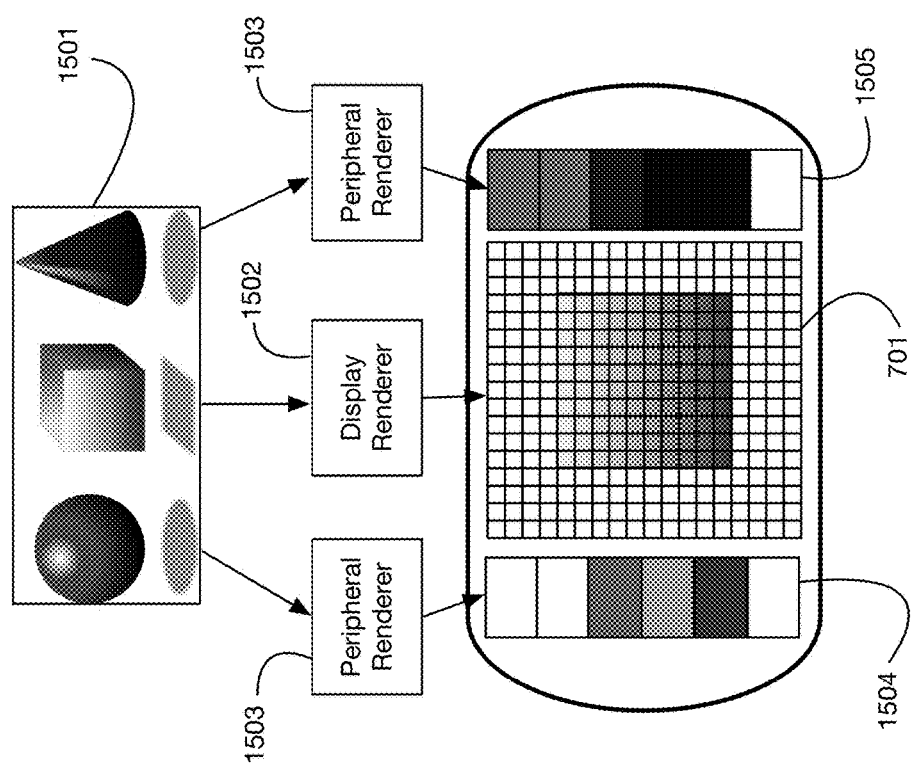
FIG. 15 illustrates an embodiment of the system that includes a display renderer to render display pixels from a 3D scene, and a peripheral renderer to render peripheral light pixels from the 3D scene.

FIG. 15 illustrates an embodiment of the system that uses a display renderer 1502 and a peripheral renderer 1503 to generate central images and peripheral light from 3D model 1501 of a scene. In this example the display renderer 1502 generates a relatively high resolution image for the central display 701, and the peripheral renderer uses an approximation to generate a low resolution image for the left peripheral light pixels 1504 and the right peripheral light pixels 1505.

Figure 16:
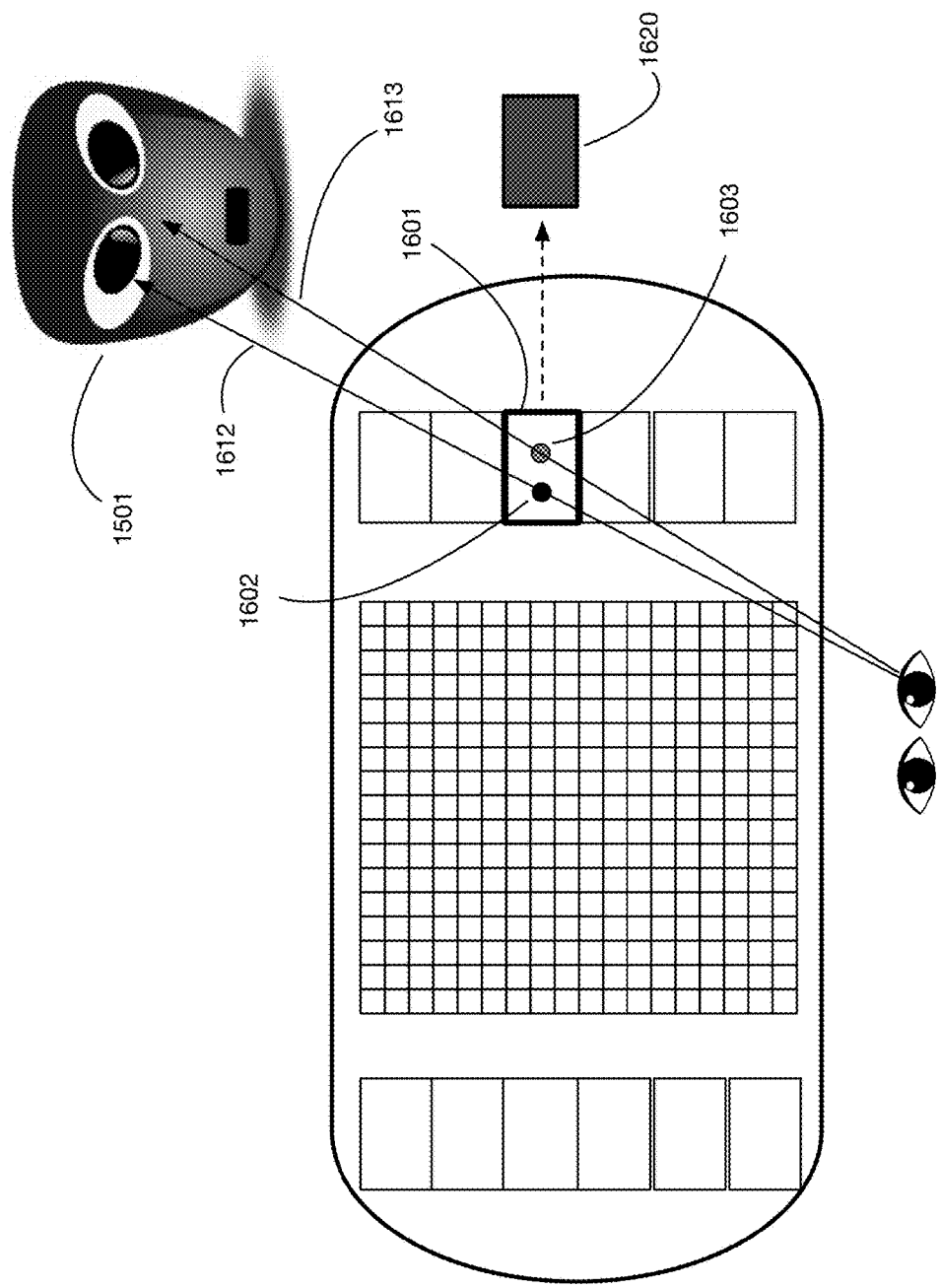
FIG. 16 illustrates an embodiment of a peripheral renderer that sets a peripheral light pixel color by sampling points within an area associated with the pixel, and averaging the color of the sampled points.

One or more embodiments may use any desired approximations for peripheral rendering. Two illustrative approximations are shown in FIG. 16 and FIG. 17. FIG. 16 illustrates an embodiment that determines the color of each peripheral light pixel by raycasting through a set of sample points located within an area associated with the peripheral light pixel, and then averaging the colors obtained on each cast ray. In this example two sample points 1602 and 1603 are selected in peripheral light pixel area 1601. The area used for sampling points may for example correspond to the physical size of the peripheral light pixel, or it may for example correspond to a region illuminated by this peripheral light pixel (or to a portion of this region). Embodiments may associate any desired area with each peripheral light pixel in order to determine the color of the peripheral light pixel. Embodiments may use any number of sample points within each peripheral light pixel area; two sample points are shown here for illustration. Ray 1612 is drawn from the user's right eye through sample point 1602; the first object in 3D model 1501 intersected by this ray determines the color selected for this sample point, which in this case is black. Similarly ray 1613 is drawn from the user's right eye through sample point 1603, determining a blue color. These two colors are averaged to form color 1620, a dark blue, for this peripheral light pixel. One or more embodiments may combine sampled colors in any desired manner, including for example, without limitation, simple averaging, weighted averaging, maximizing, minimizing, random selection, or any other procedure.

FIG. 17 illustrates another approximation technique that may be used for peripheral rendering in one or more embodiments. In this example, the color of each peripheral light pixel is determined based on the colors of display pixels that are adjacent to or close to the peripheral light pixel. This approximation may be very efficient since the display renderer has already calculated the pixel colors for the display or displays. Thus very little additional calculation is needed in this example to determine the color of each peripheral light pixel. In FIG. 17, peripheral light pixel 1601 is adjacent to the three display pixels 1701, which have colors red, white, and blue. The embodiment shown in FIG. 17 takes an average color value 1702 from the adjacent display pixels and assigns this color value to the peripheral light pixel 1601. One or more embodiments may combine colors from display pixels in any desired manner, including for example, without limitation, simple averaging, weighted averaging, maximizing, minimizing, random selection, or any other procedure.

The examples of peripheral rendering approximations shown in FIGS. 16 and 17 are illustrative; any technique for generating the color of peripheral light pixels from the 3D model of a scene is in keeping with the spirit of the invention.

While the invention herein disclosed has been described by means of specific embodiments and applications thereof, numerous modifications and variations could be made thereto by those skilled in the art without departing from the scope of the invention set forth in the claims.

What is claimed is:

1. A peripheral field-of-view illumination system for a head-mounted display comprising:
   a mount configured to be worn on a head of a user;
   one or more displays coupled to said mount and located in front of a left eye and a right eye of said user;
   a left peripheral light emitter located on a left side of said one or more displays;
   a right peripheral light emitter located on a right side of said one or more displays;
   a 3D model of a scene;
   a display renderer coupled to said 3D model of said scene and to said one or more displays; and,
   a peripheral renderer coupled to said 3D model of said scene, to said left peripheral light emitter, and to said right peripheral light emitter;
   wherein
      said one or more displays form one or more display images in a central portion of said user's field-of-view;
      light from said left peripheral light emitter is projected left of said one or more display images;
      light from said right peripheral light emitter is projected right of said one or more display images;
      said left peripheral light emitter and said right peripheral light emitter each comprise a plurality of peripheral light pixels located at different vertical positions;
      said display renderer assigns a display pixel color to each pixel of said one or more displays based on said 3D model of said scene; and,
      said peripheral renderer assigns a peripheral light pixel color to each of said peripheral light pixels based on said 3D model of said scene, wherein said peripheral renderer determines a peripheral light pixel area for each of said peripheral light pixels; calculates a sample color for one or more sample locations within each of said peripheral light pixel areas to the left of said one or more displays, from a color of a closest object in said 3D model of said scene on a ray between said left eye of said user and said sample location; calculates said sample color for one or more sample locations within each of said peripheral light pixel areas to the right of said one or more displays, from a color of a closest object in said 3D model of said scene on a ray between said right eye of said user and said sample location; averages the sample colors for all of said sample locations within each of said peripheral light pixel areas to form an average color value for said peripheral light pixel area; and, assigns said average color value as the peripheral light pixel color for the peripheral light pixel corresponding to each peripheral light pixel area.

2. The system of claim 1, wherein a total horizontal field-of-view spanned by said one or more display images, said light from said left peripheral light emitter viewed by said user, and said light from said right peripheral light emitter viewed by said user is at least 120 degrees.

3. The system of claim 1, wherein a total horizontal field-of-view spanned by said one or more display images, said light from said left peripheral light emitter viewed by said user, and said light from said right peripheral light emitter viewed by said user is at least 150 degrees.

4. The system of claim 1, wherein a total horizontal field-of-view spanned by said one or more display images, said light from said left peripheral light emitter viewed by said user, and said light from said right peripheral light emitter viewed by said user is at least 180 degrees.

5. The system of claim 1, wherein a total horizontal field-of-view spanned by said one or more display images, said light from said left peripheral light emitter viewed by said user, and said light from said right peripheral light emitter viewed by said user is more than 180 degrees.

6. The system of claim 1, wherein a vertical resolution of said peripheral light pixels is less than a vertical resolution of each of said one or more displays.

7. The system of claim 1, further comprising
   one or more left reflective surfaces located to the left of said one or more displays; and,
   one or more right reflective surfaces located to the right of said one or more displays;
   wherein
      at least a portion of said light from said left peripheral light emitter is reflected from said one or more left reflective surfaces towards said left eye of said user; and
      at least a portion of said light from said right peripheral light emitter is reflected from said one or more right reflective surfaces towards said right eye of said user.

8. The system of claim 1, wherein said peripheral renderer averages said display pixel colors for pixels of said one more displays that are adjacent to or near to each of said peripheral light pixels, to form an average color value for each of said peripheral light pixels; and,
   assigns said average color value as the peripheral light pixel color for each of said peripheral light pixels.

9. The system of claim 1, further comprising
   one or more lenses coupled to said mount, each located between one or more of the left and right eyes of said user and one or more of said one or more displays, said left peripheral light emitter, and said right peripheral light emitter;
   wherein
      said one or more lenses bend light from said left peripheral light emitter left; and,
      said one or more lenses bend light from said right peripheral light emitter right.

10. The system of claim 9 wherein at least one of said one or more lenses comprise a gradient index lens.

11. The system of claim 9 wherein at least one of said one or more lenses comprise a Fresnel lens.

12. The system of claim 9 wherein at least one of said one or more lenses comprise a holographic optical element.

13. A peripheral field-of-view illumination system for a head-mounted display comprising
   a mount configured to be worn on a head of a user;
   one or more displays coupled to said mount and located in front of a left eye and a right eye of said user;
   a left peripheral light emitter located on a left side of said one or more displays;
   a right peripheral light emitter located on a right side of said one or more displays;
   one or more left reflective surfaces located to the left of said one or more displays;
   one or more right reflective surfaces located to the right of said one or more displays;
   one or more lenses coupled to said mount, each located between one or more of the left and right eyes of said user and one or more of said one or more displays, said left peripheral light emitter, and said right peripheral light emitter;
   a 3D model of a scene;

a display renderer coupled to said 3D model of said scene and to said one or more displays; and,
a peripheral renderer coupled to said 3D model of said scene, to said left peripheral light emitter, and to said right peripheral light emitter;
wherein
said one or more displays form one or more display images in a central portion of said user's field-of-view;
light from said left peripheral light emitter is projected left of said one or more display images;
light from said right peripheral light emitter is projected right of said one or more display images;
said left peripheral light emitter and said right peripheral light emitter each comprise a plurality of peripheral light pixels located at different vertical positions;
a vertical resolution of said peripheral light pixels is less than the vertical resolution of each of said one or more displays;
said one or more lenses bend light from said left peripheral light emitter left;
said one or more lenses bend light from said right peripheral light emitter right;
at least one of said one or more lenses comprise a gradient index lens or a Fresnel lens or a holographic optical element;
a total horizontal field-of-view spanned by said one or more display images, said light from said left peripheral light emitter viewed by said user, and said light from said right peripheral light emitter viewed by said user is at least 180 degrees;
at least a portion of said light from said left peripheral light emitter is reflected from said one or more left reflective surfaces towards said left eye of said user;
at least a portion of said light from said right peripheral light emitter is reflected from said one or more right reflective surfaces towards said right eye of said user;
said display renderer assigns a display pixel color to each pixel of said one or more displays based on said 3D model of said scene; and,
said peripheral renderer assigns a peripheral light pixel color to each of said peripheral light pixels based on said 3D model of said scene.

* * * * *